UNITED STATES PATENT OFFICE.

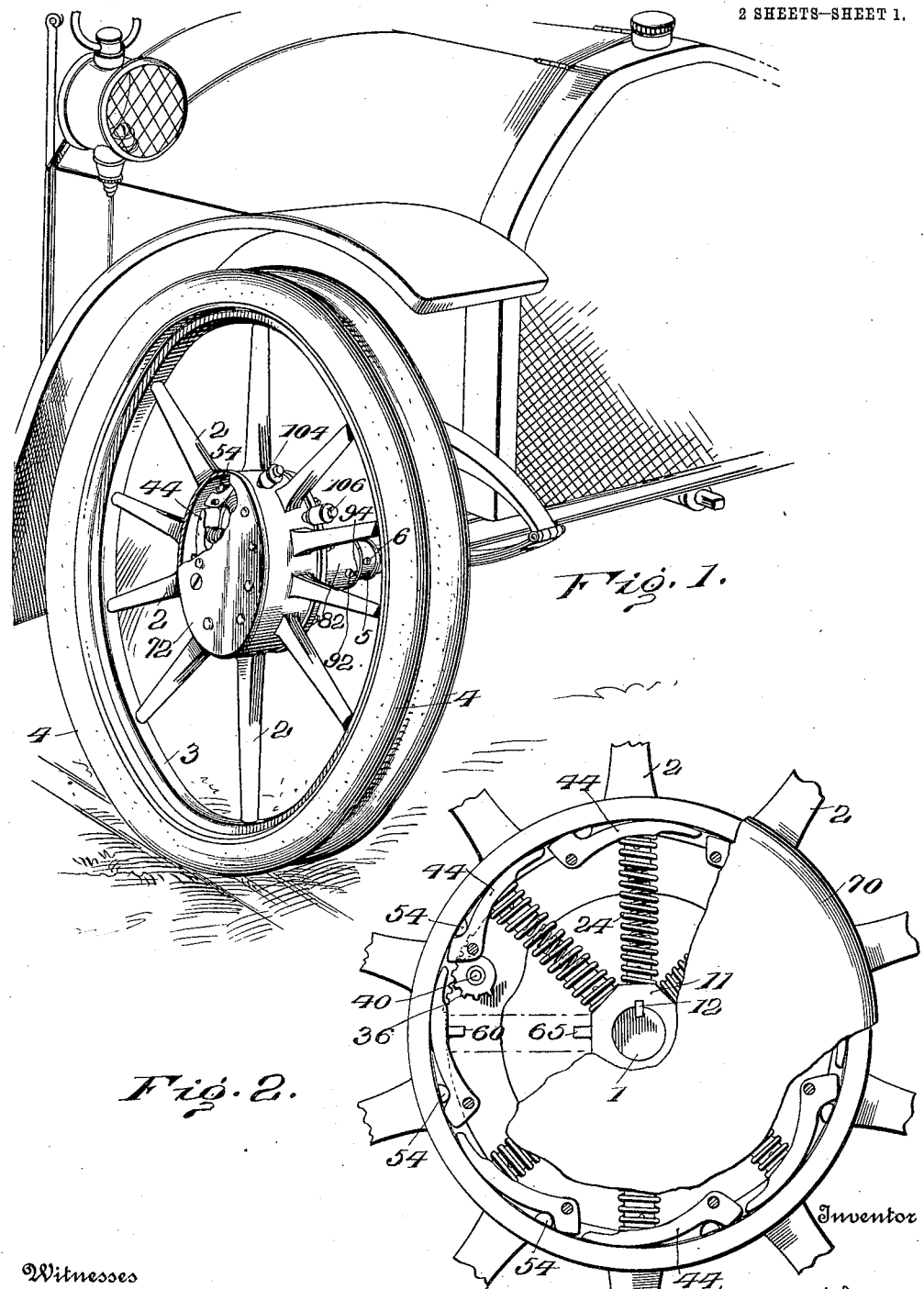

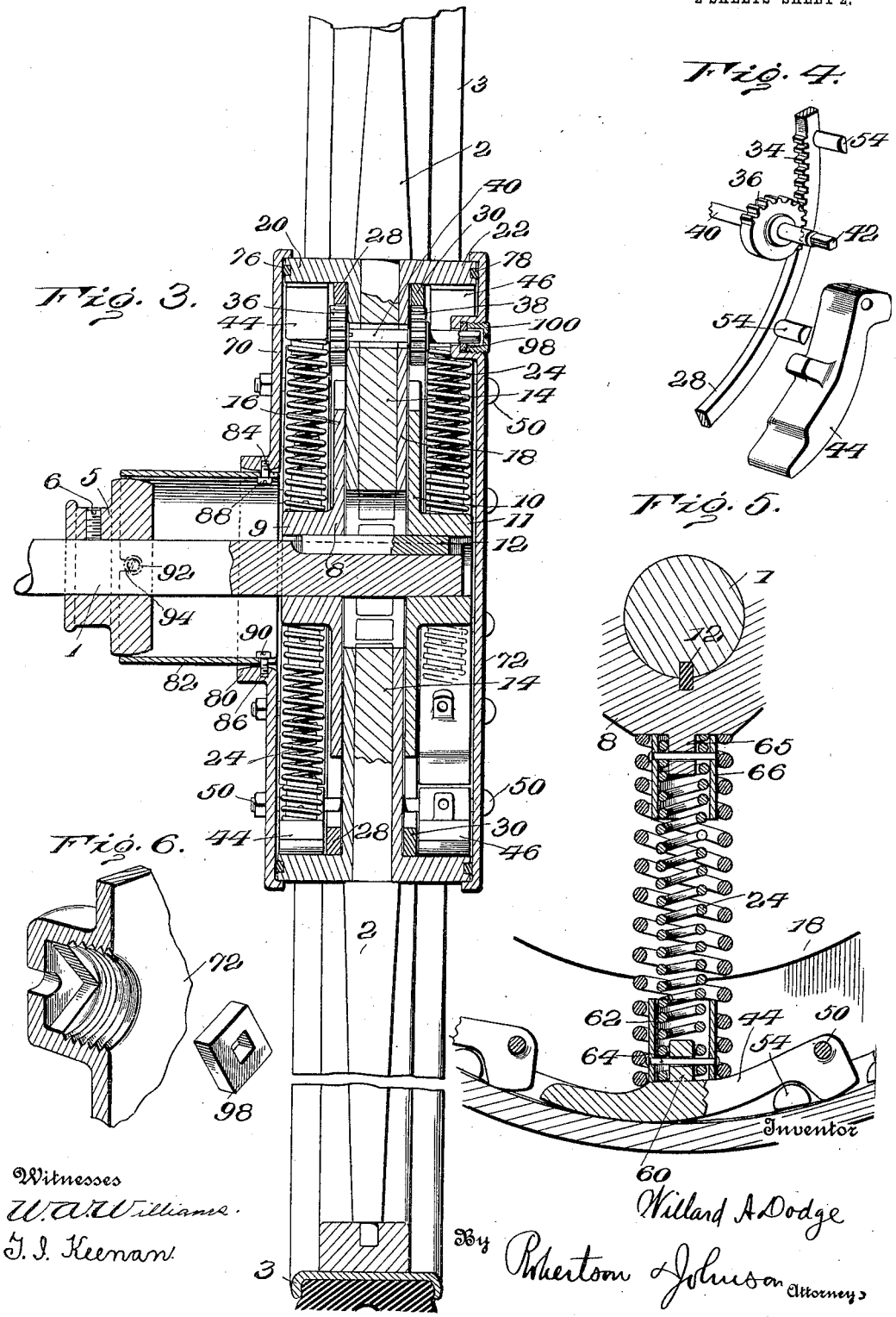

WILLARD A. DODGE, OF HORNELL, NEW YORK.

WHEEL.

1,092,029.   Specification of Letters Patent.   Patented Mar. 31, 1914.

Application filed June 4, 1912.   Serial No. 701,487.

*To all whom it may concern:*

Be it known that I, WILLARD A. DODGE, a citizen of the United States of America, and a resident of Hornell, in the county of Steuben and State of New York, have invented certain new and useful Improvements in Wheels, of which the following is a specification.

This invention relates to that form of cushioned wheels which are designed to give the necessary shock absorbing support without the use of pneumatic tires and the invention consists in a wheel of this type wherein means are provided for changing the tension of the springs to provide for heavy or light loads, the preferable embodiment of the invention being one in which the tension of all the springs is changed simultaneously.

In the accompanying drawings which illustrate the preferable embodiment of the invention: Figure 1 is a perspective view showing a wheel having my invention applied thereto, part of the hub being broken away in order to better show the parts. Fig. 2 is a vertical central section of the hub of the wheel. Fig. 3 is a vertical section taken at right angles to that shown in Fig. 2. Figs. 4, 5 and 6 are details.

Referring now to the details of the drawings by numerals: 1 designates a shaft; 2 the spokes; 3 the rim and 4 the tires, all of which may be of any desired construction. To the aforesaid shaft 1 is secured a collar 5, as by the set screw 6, and two preferably cast disks 8 and 10, the latter being held by the key 12, all of which are clearly illustrated in Fig. 3. The disks 8 and 10 have annular rings or flanges 9 and 11 projecting outwardly therefrom in opposite directions as illustrated. The three members referred to, the collar 5 and the disks 8 and 10, are the only parts of my wheel which are rigidly connected to the shaft 1, all the other parts to be hereinafter described having a cushioned or resilient connection with the said shaft. The spokes 2 have their shanks 14 inserted within the openings formed between two adjacent, preferably cast, plates 16 and 18, these plates each having annular rings or flanges 20 and 22. Between the annular rings or flanges 9 and 11 on the disks 8 and 10 and the annular rings or flanges 20 and 22, I locate the spring cushioning means 24, but instead of having these spring cushioning means co-act directly with the annular rings or flanges 20 and 22, I provide the following means interposed between the springs and said rings or flanges. First I insert rings 28 and 30, these rings fitting snugly against the plates 16 and 18 as illustrated in Fig. 3, each ring having on a small portion of its interior, a rack 34 as illustrated best in Fig. 4. The purpose of forming racks on the rings 28 and 30 is that the racks may co-act with two gears 36 and 38 fixed to a shaft 40, on opposite sides of the plates 16 and 18, the shaft 40 having a squared end 42 whereby a key may be fitted to it to turn the shaft and its gears 36 and 38 in order that slight rotary movement may be imparted to the rings 28 and 30, for a purpose to be described.

Located adjacent to the rings 28 and 30 are two series of pivoted springs seats 44 and 46, these seats being of the form shown best in Figs. 4 and 5 from which it will be seen that they are pivotally supported on bolts 50. Each pivoted seat is so formed that it is curved near its pivoted end so as to leave a space between its lower side and its annular ring, as indicated in Fig. 5, and into the said spaces are a series of lugs or projections 54 projecting from the annular rings 28 and 30. The construction is such that if the parts are in the position shown in Fig. 5, the operator may, by applying a key to the squared end 42 of the shaft 36, turn said shaft and rotate the rings 28 and 30 so as to move the lugs or projections 54 with respect to the pivoted seats 44 and 46. The result of this movement is that the lugs or projections 54 are forced to the left, when viewed as in Fig. 5, and the left hand end of each pivoted seat is thus moved upward, swinging on its pivot 50. Inasmuch as the rings 28 and 30 extend entirely around the interior of the flanges 20 and 22, and inasmuch as the pivoted seats are provided for all of the springs, it follows that when the rings 28 and 30 are moved in the direction just referred to, all of the springs are thereby slightly compressed so that a stiffer resilient cushioning means is provided than when the rings 28 and 30 are moved in the other direction.

It will be seen from the construction described that I am enabled to provide a wheel having a spring cushioning means adapted to carry a light load when necessary, and one which can, by the simple rotation of the spindle 40, be adjusted so that the springs are under higher tension, thus providing for heavier loads.

In order to provide an effectual manner of holding the springs in position, I form on or connect to each of the pivoted seats 44 and 46 a lug 60 and surrounding this lug is a cylindrical shell 62 held to the lug by means of a pin 64. The annular rings or flanges 9 and 11 have similar lugs 65 and cylindrical shells 66 as clearly illustrated in the drawings. The inner spring has its ends located between the lugs and the cylindrical shells while the outer spring surrounds the cylindrical shells all as clearly outlined in the drawings.

On the outside of the hub portion of the wheel are secured two plates 70 and 72, these plates being securely fixed in position by means of the same bolts 50 on which the seats 44 and 46 are pivoted, packing rings 76 and 78 being provided whereby a tight joint is made between the plates 70 and 72 and the annular rings or flanges 20 and 22. The plate 70 is provided with a central aperture and with an annular flange 80, and it is necessary to connect this plate 70 with the collar 5 by means of a joint which will be more or less flexible in order that the wheel may move with respect to the axle 1. To provide this flexible connection I connect the collar 5 and the annular flange 80 by means of a tubular member 82. This member 82 has two slots 84 and 86 which are for the purpose of co-acting with two screws 88 and 90, as illustrated in Fig. 3, the construction being such that when the parts are assembled the hub section may move on the screws 88 and 90 as pivots. Likewise, the other end of the cylindrical section 82 is connected to the collar 5 by means of screws 92 which enter slots 94 indicated in dotted lines in Fig. 3. It will be noticed that the screws 88 and 90 are at right angles to the screws 92 so that I am enabled to provide movement in all directions.

The aforesaid outer plate 72 is provided with a depressed portion 96 through which the squared end 42 of the shaft 40 projects as illustrated in Fig. 3. The bottom of this depressed portion 96 is preferably square so that a square washer 98 with a square opening in it may be inserted in the aperture in said depressed portion 96, said washer thereby preventing the shaft from turning. An exteriorly screw threaded cap 100 is provided which is adapted to be inserted in the screw threaded aperture in the depressed portion 96 so that, when this cap is in position, the spring wheel is sufficiently tight to enable it to contain oil, oil cups 104 and 106 being provided for that purpose. Whenever it is necessary to adjust the tension of the springs, the operator needs only to remove the cup 100 and the square washer 98 when, by applying a suitable key to the square end 42 of the shaft 40, said shaft may be rotated for the purpose of rotating its gears 36 and 38 to move the rings 28 and 30 the proper distance to cause the lugs 54 to co-act with the pivoted seats 44 and 46, to move said seats inward, if in the position shown in Fig. 5, to increase the tension of the springs and thereby make a stiffer wheel adapted to carry a heavier load. On the other hand, if the springs are held compressed and it is desired to use the wheel for light loads, the shaft 40 may be rotated in the reverse direction thus permitting the seats 44 and 46 to move back to the position shown in Fig. 5, thus providing a spring wheel adapted to carry lighter loads. As before stated, the rotation of the shaft 40 simultaneously adjusts all of the seats 44 and 46, thereby giving simultaneous movement to all the springs. When the shaft 40 has been rotated to the desired extent, the washer 98 is inserted over the square end 42 of the shaft 40 into the square aperture in the recessed portion 96, when said shaft will be locked in position. Then the screw cap 100 may be screwed into position and the wheel is ready for use.

It is obvious that modifications may be made without departing from the spirit of my invention, the scope of which is set forth in the appended claims.

What I claim as my invention is:

1. In a wheel, the combination of an axle section and a wheel section, springs interposed between said sections and means for adjusting the tension of said springs comprising a pivoted spring seat for each spring and a device for moving said spring seat against the tension of the spring to hold the same under compression.

2. In a wheel, the combination of an axle section and a wheel section, springs interposed between said sections and means for adjusting the tension of said springs comprising a series of pivoted spring seats, and a movable ring co-acting with said spring seats to move the same.

3. In a wheel, the combination of an axle section and a wheel section, springs interposed between said sections and means for adjusting the tension of said springs comprising a series of pivoted spring seats, a movable ring co-acting with said seats having rack teeth thereon and a shaft having a gear thereon co-acting with the teeth on said ring.

4. In a wheel, the combination of an axle section and a wheel section, springs interposed between said sections, movable seats for said springs, a ring having projections co-acting with said seats to move the same when the ring is moved, said ring having teeth thereon and a shaft having a gear meshing with the teeth on said ring whereby the ring may be moved upon the rotation of said shaft.

5. In a wheel, the combination of an axle section and a wheel section, two sets of springs, one set on each side of the central line of the wheel, movable seats for each of the springs, said springs co-acting with the said seats, a ring co-acting with said seats to move the same when the ring is moved, and means for giving said rings and seats simultaneous movement comprising a shaft with two gears thereon one gear meshing with one ring and the other gear meshing with the other ring.

6. In a wheel, the combination of an axle section and a wheel section, springs interposed between said sections and a cylindrical shell connecting the axle section with the wheel section, a pivotal connection between said cylindrical shell and said axle section and a pivotal connection between said cylindrical shell and said wheel section.

7. In a wheel, the combination of an axle section, a wheel section, springs interposed between said axle and said wheel sections, a collar on said axle, and a cylindrical shell between said collar and said wheel section, said cylindrical shell having a pivotal connection with said collar and a pivotal connection with said wheel section.

8. In a wheel, the combination of an axle section, a wheel section, springs interposed between said axle and said wheel sections, a collar on said axle, and a cylindrical shell between said collar and said wheel section, said cylindrical shell having a pivotal connection with said collar and a pivotal connection with said wheel section, said pivotal connections being at right angles to each other.

9. In a wheel, the combination of an axle section, a wheel section, springs interposed between said sections, means for adjusting the tension of said springs comprising a rack, pinion and shaft, the shaft projecting through the wheel section, said shaft having an irregular shaped end, a washer of irregular shape fitting said shaft and locking the same from movement.

10. In a wheel, the combination of an axle section, a wheel section, springs interposed between said sections, means for adjusting the tension of said springs comprising a rack, pinion and shaft, the shaft projecting through the wheel section, said shaft having an irregular shaped end, a washer of irregular shape fitting said shaft and locking the same from movement, and a cap screwed over said washer and holding the same in position.

11. In a wheel, the combination of an axle section, a wheel section, springs interposed between said sections, one spring being located within another, a pivoted seat for each set of springs, means for moving said seats, said wheel section and said spring section each having a lug entering the inner spring of each set and a sleeve projecting between the springs of each set.

In testimony whereof I affix my signature in presence of two witnesses.

WILLARD A. DODGE.

Witnesses:
HARRY A. ALLEN,
MINNIE CHANDLER.

---

Copies of this patent may be obtained for five cents each, by addressing the "Commissioner of Patents, Washington, D. C."